United States Patent
Ramakrishna

(10) Patent No.: US 8,767,642 B2
(45) Date of Patent: Jul. 1, 2014

(54) EFFICIENT IMPLICIT INDICATION OF THE SIZE OF MESSAGES CONTAINING VARIABLE-LENGTH FIELDS IN SYSTEMS EMPLOYING BLIND DECODING

(75) Inventor: Sudhir Ramakrishna, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 538 days.

(21) Appl. No.: 12/953,306

(22) Filed: Nov. 23, 2010

(65) Prior Publication Data

US 2011/0149891 A1 Jun. 23, 2011

Related U.S. Application Data

(60) Provisional application No. 61/288,175, filed on Dec. 18, 2009.

(51) Int. Cl.
H04W 4/00 (2009.01)
H04W 72/00 (2009.01)

(52) U.S. Cl.
USPC .......................................... 370/329; 455/450

(58) Field of Classification Search
CPC .. H04W 72/042; H04W 48/12; H04L 1/1614; H04L 5/0053
USPC .......... 370/328, 329, 341, 431; 455/450, 451, 455/452.1, 464, 509
See application file for complete search history.

(56) References Cited

U.S. PATENT DOCUMENTS

| | | | |
|---|---|---|---|
| 8,223,686 B2 * | 7/2012 | Cho et al. ....................... | 370/319 |
| 8,411,625 B2 * | 4/2013 | Maheshwari et al. ......... | 370/329 |
| 2004/0248575 A1 * | 12/2004 | Rajala et al. ................... | 455/436 |
| 2005/0201325 A1 * | 9/2005 | Kang et al. ..................... | 370/328 |
| 2008/0096567 A1 * | 4/2008 | Rajala et al. ................... | 455/438 |
| 2009/0022098 A1 * | 1/2009 | Novak et al. ................... | 370/329 |
| 2009/0067379 A1 * | 3/2009 | Kim et al. ...................... | 370/329 |
| 2009/0073928 A1 * | 3/2009 | Power et al. ................... | 370/329 |

(Continued)

FOREIGN PATENT DOCUMENTS

| | | |
|---|---|---|
| KR | 1020090039591 A | 4/2009 |
| KR | 1020090092673 A | 9/2009 |

OTHER PUBLICATIONS

Written Opinion of the International Searching Authority dated Aug. 26, 2011 in connection with International Patent Application No. PCT/KR2010/009058.

(Continued)

Primary Examiner — Ayaz Sheikh
Assistant Examiner — Hoang-Chuong Vu

(57) ABSTRACT

For use in a wireless network, a base station configured to communicate in the wireless network is provided. The base station includes a processor coupled to a transmitter and configured to generate a resource allocation message. The resource allocation message includes a plurality of fixed length fields, one or more primary variable-length fields, and a plurality of secondary variable-length fields. The one or more primary variable-length fields occupy a position in the resource allocation message preceding as many of the fixed length fields as permitted by rules that govern a structure of the resource allocation message. The one or more primary variable-length fields are positioned in the resource allocation message such that when the resource allocation message is partitioned and allocated across a sequence of basic units (BUs), every primary variable-length field appears in a smallest possible sequence of BUs starting from the first BU in the sequence.

36 Claims, 6 Drawing Sheets

| SYNTAX | SIZE IN BITS | DESCRIPTION/NOTES |
|---|---|---|
| DL GROUP RESOURCE ALLOCATION A-MAP_IE() { | - | - |
| A-MAP IE TYPE | 4 | DL GROUP RESOURCE ALLOCATION A-MAP IE |
| USER BITMAP | VARIABLE | BITMAP TO INDICATE SCHEDULED AMSs IN A GROUP. THE SIZE OF THE BITMAP IS EQUAL TO THE USER BITMAP SIZE SIGNALED TO EACH AMS IN THE GROUP CONFIGURATION MAC CONTROL MESSAGE<br>0b0: AMS NOT ALLOCATED IN THIS AAI SUBFRAME<br>0b1: AMS ALLOCATED IN THIS AII SUBFRAME |
| RESOURCE OFFSET | 7 | INDICATES STARTING LRU FOR RESOURCE ASSIGNMENT TO THIS GROUP |
| HFA OFFSET | 6 | INDICATES THE START OF THE HARQ FEEDBACK CHANNEL INDEX USED FOR SCHEDULED ALLOCATIONS |
| IF(GROUP MIMO MODE SET ==0b01){ | | |
| MIMO BITMAP | VARIABLE | BITMAP TO INDICATE MIMO MODE FOR THE SCHEDULED AMSs<br>0b0: MODE 0<br>0b1: MODE 1 |
| } | | |
| RESOURCE ASSIGNMENT BITMAP | VARIABLE | BITMAP TO INDICATE BURST SIZE/RESOURCE SIZE FOR EACH SCHEDULED AMS |
| } | - | - |

500

(56) References Cited

U.S. PATENT DOCUMENTS

| | | | | |
|---|---|---|---|---|
| 2009/0103435 A1* | 4/2009 | Celentano et al. | ............ | 370/232 |
| 2010/0254291 A1* | 10/2010 | Youn et al. | .................... | 370/311 |
| 2010/0260128 A1* | 10/2010 | Cho et al. | ...................... | 370/329 |
| 2010/0266057 A1* | 10/2010 | Shrivastava et al. | ........... | 375/260 |
| 2011/0044266 A1* | 2/2011 | Shrivastava et al. | ........... | 370/329 |
| 2012/0093116 A1* | 4/2012 | Kim et al. | .................... | 370/329 |
| 2012/0099556 A1* | 4/2012 | Kim et al. | .................... | 370/329 |
| 2012/0120902 A1* | 5/2012 | Park et al. | .................... | 370/329 |
| 2012/0320837 A1* | 12/2012 | Kim et al. | .................... | 370/329 |

OTHER PUBLICATIONS

International Search Report dated Aug. 26, 2011 in connection with International Patent Application No. PCT/KR2010/009058.
Xianming Chen, et al., "Proposed Text on Group Resource Allocation IEs", ZTE Corporation, Aug. 24, 2009, 4 pages.
Sudhir Ramakrishna, et al., "Summary of the Structure & Interpretation of the "Resource Allocation" field in the DL/UL Sub-band Assignment A-MAP IEs in the IEEE 802.16m Amendment", Aug. 29, 2009, 13 pages.

* cited by examiner

FIG. 3

| SYNTAX | SIZE IN BITS | DESCRIPTION/NOTES |
|---|---|---|
| DL GROUP RESOURCE ALLOCATION A-MAP_IE() { | - | - |
| A-MAP IE TYPE | 4 | DL GROUP RESOURCE ALLOCATION A-MAP IE |
| RESOURCE OFFSET | 7 | INDICATES STARTING LRU FOR RESOURCE ASSIGNMENT TO THIS GROUP |
| HFA OFFSET | 6 | INDICATES THE START OF THE HARQ FEEDBACK CHANNEL INDEX USED FOR SCHEDULED ALLOCATIONS |
| USER BITMAP | VARIABLE | BITMAP TO INDICATE SCHEDULED AMSs IN A GROUP. THE SIZE OF THE BITMAP IS EQUAL TO THE USER BITMAP SIZE SIGNALED TO EACH AMS IN THE GROUP CONFIGURATION MAC CONTROL MESSAGE<br><br>0b0: AMS NOT ALLOCATED IN THIS AAI SUBFRAME<br>0b1: AMS ALLOCATED IN THIS AII SUBFRAME |
| if(GROUP MIMO MODE SET ==0b01){ | | |
| MIMO BITMAP | VARIABLE | BITMAP TO INDICATE MIMO MODE FOR THE SCHEDULED AMSs<br><br>0b0: MODE 0<br>0b1: MODE 1 |
| } | | |
| RESOURCE ASSIGNMENT BITMAP | VARIABLE | BITMAP TO INDICATE BURST SIZE/RESOURCE SIZE FOR EACH SCHEDULED AMS |
| } | - | - |

FIG. 5

| SYNTAX | SIZE IN BITS | DESCRIPTION/NOTES |
|---|---|---|
| DL GROUP RESOURCE ALLOCATION A-MAP_IE() { | - | - |
| A-MAP IE TYPE | 4 | DL GROUP RESOURCE ALLOCATION A-MAP IE |
| USER BITMAP | VARIABLE | BITMAP TO INDICATE SCHEDULED AMSs IN A GROUP. THE SIZE OF THE BITMAP IS EQUAL TO THE USER BITMAP SIZE SIGNALED TO EACH AMS IN THE GROUP CONFIGURATION MAC CONTROL MESSAGE<br><br>0b0: AMS NOT ALLOCATED IN THIS AAI SUBFRAME<br>0b1: AMS ALLOCATED IN THIS AII SUBFRAME |
| RESOURCE OFFSET | 7 | INDICATES STARTING LRU FOR RESOURCE ASSIGNMENT TO THIS GROUP |
| HFA OFFSET | 6 | INDICATES THE START OF THE HARQ FEEDBACK CHANNEL INDEX USED FOR SCHEDULED ALLOCATIONS |
| if(GROUP MIMO MODE SET ==0b01){ | | |
| MIMO BITMAP | VARIABLE | BITMAP TO INDICATE MIMO MODE FOR THE SCHEDULED AMSs<br><br>0b0: MODE 0<br>0b1: MODE 1 |
| } | | |
| RESOURCE ASSIGNMENT BITMAP | VARIABLE | BITMAP TO INDICATE BURST SIZE/RESOURCE SIZE FOR EACH SCHEDULED AMS |
| } | - | - |

EFFICIENT IMPLICIT INDICATION OF THE SIZE OF MESSAGES CONTAINING VARIABLE-LENGTH FIELDS IN SYSTEMS EMPLOYING BLIND DECODING

CROSS-REFERENCE TO RELATED APPLICATION(S) AND CLAIM OF PRIORITY

The present application is related to U.S. Provisional Patent Application No. 61/288,175, filed Dec. 18, 2009, entitled "EFFICIENT IMPLICIT INDICATION OF THE SIZE OF MESSAGES CONTAINING VARIABLE-LENGTH FIELDS IN SYSTEMS EMPLOYING BLIND DECODING". Provisional Patent Application No. 61/288,175 is assigned to the assignee of the present application and is hereby incorporated by reference into the present application as if fully set forth herein. The present application hereby claims priority under 35 U.S.C. §119(e) to U.S. Provisional Patent Application No. 61/288,175.

TECHNICAL FIELD OF THE INVENTION

The present application relates generally to wireless communication systems and, more specifically, to a system and method for determining the size of messages containing variable length fields in systems employing blind decoding.

BACKGROUND OF THE INVENTION

In a typical cellular communications system, a certain geographical region is divided into regions called cells. The mobile stations (MSs) in each cell are served by a single base station (BS). A BS transmits information to a particular MS (or a group of MSs) in its cell on the radio path referred to as the downlink (DL), while the MSs transmit information to the BS on the radio path referred to as the uplink (UL). The transmissions on the UL and the DL may be on the same time intervals but on different frequency bands (referred to as frequency division duplexing, or FDD), or on the same frequency band but during non-overlapping time intervals (referred to as time division duplexing, or TDD).

In one type of cellular communication system, the transmissions on the DL and UL are based on OFDM (Orthogonal Frequency Division Multiplexing) modulation. In OFDM modulation, the available bandwidth for the radio link (DL or UL) is divided into a large number of smaller-bandwidth units referred to as sub-carriers (SCs), onto which the information to be transmitted is embedded.

SUMMARY OF THE INVENTION

For use in a wireless network, a base station configured to communicate in the wireless network is provided. The base station includes a processor coupled to a transmitter and configured to generate a resource allocation message. The resource allocation message includes a plurality of fixed length fields, one or more primary variable-length fields, and a plurality of secondary variable-length fields. The one or more primary variable-length fields occupies a position in the resource allocation message preceding as many of the fixed length fields as permitted by rules that govern a structure of the resource allocation message.

For use in a wireless network, a subscriber station configured to communicate in the wireless network is provided. The subscriber station includes a processor coupled to a receiver and configured to receive a resource allocation message. The resource allocation message includes a plurality of fixed length fields, one or more primary variable-length fields, and a plurality of secondary variable-length fields. The one or more primary variable-length fields occupies a position in the resource allocation message preceding as many of the fixed length fields as permitted by rules that govern a structure of the resource allocation message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 is a table illustrating a structure of a Group Resource Allocation message (GRA IE), according to one embodiment of the present disclosure;

FIG. 5 is a table illustrating a structure of a GRA IE, according to an embodiment of the present disclosure.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein:

IEEE-802.16e-2005, IEEE Standard for Local and Metropolitan Area Networks, "Part 16: Air Interface For Fixed And Mobile Broadband Wireless Access Systems", Amendment 2: "Physical and Medium Access Control Layers for Combined Fixed and Mobile Operation in Licensed Bands" and IEEE-802.16-2004, Cor1-2005, Corrigendum 1, December 2005 (hereinafter "the IEEE 802.16e system");

3GPP TS 36.300, "3rd Generation Partnership Project; TSG Radio Access Network; Evolved Universal Terrestrial Radio Access (E-UTRA) and Evolved Universal Terrestrial Radio Access Network (E-UTRAN); Overall Description; Stage 2 (Release 8)", version 8.7.0, December 2008 (hereinafter "the LTE system"); and P802.16m-D3, "Part 16—Air Interface For Fixed and Mobile Broadband Wireless Access Systems", December 2009, found at the time of filing at http://wirelessman.org/tgm/ (hereinafter "the proposed IEEE 802.16e system").

Figure 1:
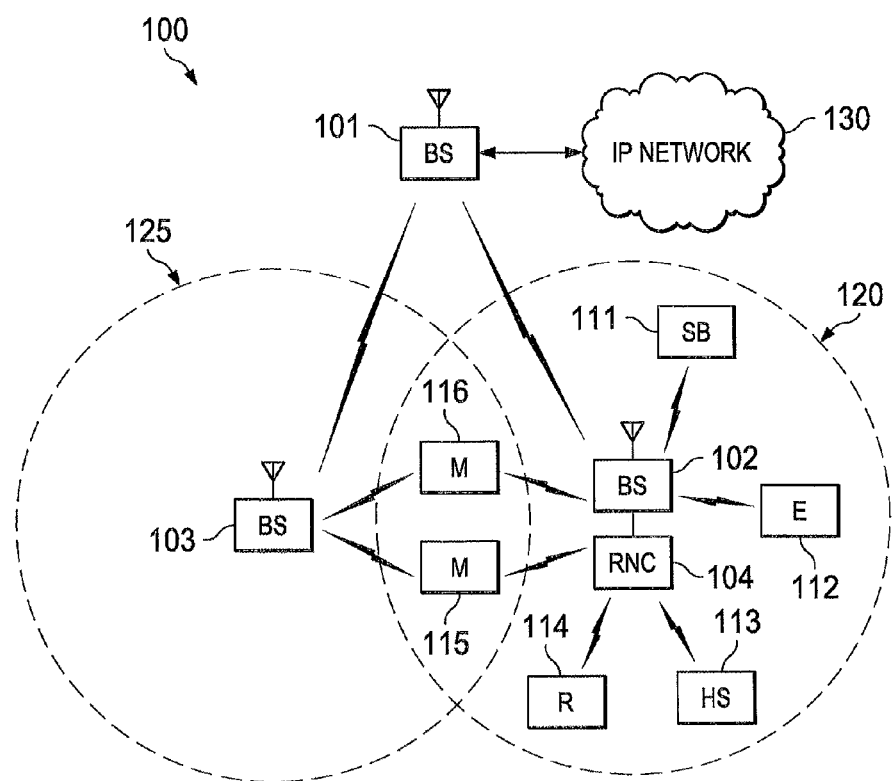
FIG. 1 illustrates a wireless network according to one embodiment of the present disclosure.

FIG. 1 illustrates a wireless network 100 according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network. Base station 102 communicates with Radio Network Controller (RNC) 104. In certain embodiments, RNC 104 may be a part of base station 102. In certain embodiments, base station 101 and base station 103 may also communicate with RNC 104. In other embodiments, base station 101 and base station 103 may include, or be in communication with, another radio network controller similar to RNC 104.

Base station 102, either in cooperation with RNC 104 or through RNC 104, provides wireless broadband access to network 130 to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber stations 111-116 may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a Wi-Fi hotspot (HS), SS 114 may be located in a residence, and SS 115 and SS 116 may be mobile devices.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a Wi-Fi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

Each of the base stations 101-103 and subscriber stations 111-116 includes elements configured to enable communication within wireless network 100. These elements may include standard elements for wireless communication, such as one or more transmitters, receivers, antennas, processors, controllers, memories, software, and so forth. In accordance with embodiments of the present disclosure, base stations 101-103 may be configured to communicate with subscriber stations 111-116 using OFDM modulation.

Although FIG. 1 depicts one example of a wireless network 100, various changes may be made to FIG. 1. For example, another type of data network, such as a wired network, may be substituted for wireless network 100. In a wired network, network terminals may replace BS's 101-103 and SS's 111-116. Wired connections may replace the wireless connections depicted in FIG. 1. For ease of explanation, the terms subscriber station (SS) and mobile station (MS) will be used interchangeably herein.

In a communication system (e.g., wireless network 100) using OFDM modulation, on the UL, if the MSs communicating with a BS simultaneously use non-overlapping subcarrier (SC) sets to make transmissions to the BS, then when received at the BS, the transmission from any MS is rendered orthogonal to the transmission from any other MS. To clarify further, suppose that MS i uses SC set {Si} to make UL transmissions to the BS, and that the SC sets used by different MSs are non-overlapping. Then, when received at the BS, the transmissions from MS i on SC set {Si} are not interfered with by any of the transmissions to the BS from any of the MSs j, where j≠i.

Similarly, on the DL, if the BS uses non-overlapping SCs to make simultaneous transmissions to different MSs, then at any MS, the transmissions intended for other MSs appear orthogonal to the transmissions intended for the one MS. To clarify further, suppose that the BS makes transmissions to MS i using SC set {Si}, and uses non-overlapping SC sets to make transmissions to various MSs. Then, when received at the MS i, the transmissions from the BS on SC set {Si} are not interfered with by any of the transmissions from the BS to any of the MSs j, where j≠i.

This property of OFDM modulation allows simultaneous communications between several MSs and the BS on the UL, and the BS and several MSs on the DL.

In such an OFDM system, on the UL, the transmissions by the MSs are coordinated to ensure that non-overlapping SC sets are being used. Each MS is instructed by the BS as to which SC set to use for transmissions to the BS. Similarly, on the DL, the BS uses non-overlapping SC sets to make transmissions to the MSs. The MSs are instructed by the BS as to which SC sets to listen to receive the transmissions meant for them.

These instructions to the MSs, including which SC set to use for UL transmissions, and on which SC set to receive DL transmissions, are sometimes referred to as Resource Allocation Messages. The resource allocation messages are themselves transmitted by the BS on a SC set sometimes referred to as the Resource Allocation Region. To clarify, several resource allocation messages are carried on SCs, which are part of the resource allocation region. In embodiments of the present disclosure, a single resource allocation message or a set of resource allocation messages may convey a resource allocation to a single mobile or a set of mobiles.

The resource allocation region is known to all MSs. Each MS receives, decodes and interprets the resource allocation messages in the resource allocation region to learn about the SC set it is to use for UL transmissions and/or the SC set on which it is to receive DL transmissions.

The IEEE 802.16e system and the proposed IEEE 802.16m system are examples of an OFDM based system that employs resource allocation messages and resource allocation regions as described above. In the IEEE 802.16e system, the resource allocation messages are referred to as MAP messages and the resource allocation region is referred to as the MAP-Region.

With respect to the design and structure of the resource allocation messages in the resource allocation region, and the procedure for the MSs to decode and interpret the resource allocation messages, two practices are commonly followed: the "joint encoding" practice and the "MS-specific encoding, blind decoding" practice. These practices will now be described.

In the "joint encoding" practice, all the resource allocation messages, possibly meant for several MSs, are jointly encoded, modulated and transmitted on the resource allocation region. Pre-determined coding and modulation schemes, which are known to all MSs, are utilized. Each individual resource allocation message contains information regarding the MS (or group of MSs) for which the message is meant to allocate resources. Each MS receives and decodes the jointly encoded set of resource allocation messages. Then, the MS, having access to all the resource allocation messages, identifies the messages that are meant for it, and consequently identifies the resources that the MS is meant to transmit and/or receive on. This practice promotes simple decoding at the MS, but is wasteful of resources, since it has to be ensured that the jointly encoded resource allocation message set reaches (i.e., is decodable by) all MSs in the BS. The IEEE 802.16e system utilizes this practice.

In the "MS-specific encoding, blind decoding" practice, each of the individual resource allocation messages are carried on one or more "basic units" (BUs). A basic unit is a set of a known number of information bits, encoded, modulated and scrambled in a known way (the scrambling process is described below). A basic unit is sometimes referred to as a "minimum logical resource unit" (mLRU).

Each of the BUs meant for a particular MS are encoded, scrambled and modulated separately, and then embedded onto the SCs in the resource allocation region. In an embodiment, a BU is scrambled in such a way that only the target MS for the BU is able to decode the BU, realize the BU has been decoded correctly, and then interpret the BU (either singly where one BU corresponds to one resource allocation message, or in conjunction with other BUs where many BUs are used to convey one resource allocation message).

To clarify further, consider a BU intended for MS i. Usually, only MS i can decode the BU (with some probability of error), realize that it has decoded the BU correctly, then proceed to interpret the decoded bits in the BU. Any other MS j, j≠i, when attempting to decode the BU, would be unable to do so, and would realize that it is unable to decode the BU. As a result, MS j would realize that that BU is not intended for it. In some circumstances, there may be a probability, designed to be small, that MS j, j≠i, erroneously concludes that the BU was intended for it. A well known method for discovering whether or not a BU is meant for a mobile, and whether a decode attempt is successful, is the use of a Cyclic Redundancy Check (CRC) scrambled by a MS-specific bit sequence.

In using a CRC, the first step is to calculate the value of a known linear combination of information bits in the BU; this linear combination is referred to as the CRC. Next, the CRC value is XORed with an identification bit sequence that is unique to the intended recipient MS (where XOR refers to the binary exclusive-OR operation). This yields the scrambled CRC bit sequence. The scrambled CRC is then appended to the end of the BU. A MS, after the decode attempt, then calculates the same linear combination on the BU information bits it thinks it has decoded, and then XORs the calculated CRC with the scrambled CRC that was appended to the end of the BU by the base station. Due to the characteristics of the XOR operation, if the BU has been decoded correctly (i.e., if the linear combination on the information bits calculated by the MS is correct), then the XOR operation simply yields the identification bit sequence used by the base station in constructing the scrambled CRC. If the identification sequence matches the MS's identification sequence, then the MS knows that the BU has been decoded correctly and that the BU is meant for it.

In situations where the BU is intended to be decoded by several MSs, then the identification bit sequence that is used is one which is known to all of the MSs.

The resource allocation region may be divided into several sub-regions, each consisting of a set of BUs. As described above, the BUs, either singly or in groups, carry the resource allocation messages. In each sub-region, a different (but known) set of modulation/coding may be used for each of the BUs in that sub-region. This set of BU information sizes and structure (modulation & coding used) is defined and known to all MSs. Each MS attempts to decode the individual BUs in each sub-region of the resource allocation region, using the knowledge of the structure (size in bits, modulation, coding) of the BU in that sub-region. After successfully decoding a BU (or a set of BUs), the MS may attempt to reconstruct the underlying resource allocation message carried in the BU or set of BUs. This procedure is often referred to as blind decoding, with "blind" referring to the fact that a MS attempts the decoding with no knowledge of whether or not a BU is intended for it.

With the "MS-specific encoding, blind decoding" practice, a resource allocation message can be transmitted with the optimal modulation and coding for reception by a particular MS, taking into account the radio link quality between the BS and that MS. Hence, this practice makes a more efficient use of the resource allocation region than the "Joint Encoding" practice. However, due to the use of the blind decoding operation, it imposes higher complexity on the MS. The LTE System and the proposed IEEE 802.16m system utilize the "MS-specific encoding, blind decoding" practice. In the proposed IEEE 802.16m system, the BU contains forty (40) information bits, to which sixteen (16) CRC bits are appended, making a total of fifty-six (56) bits.

Figure 2:
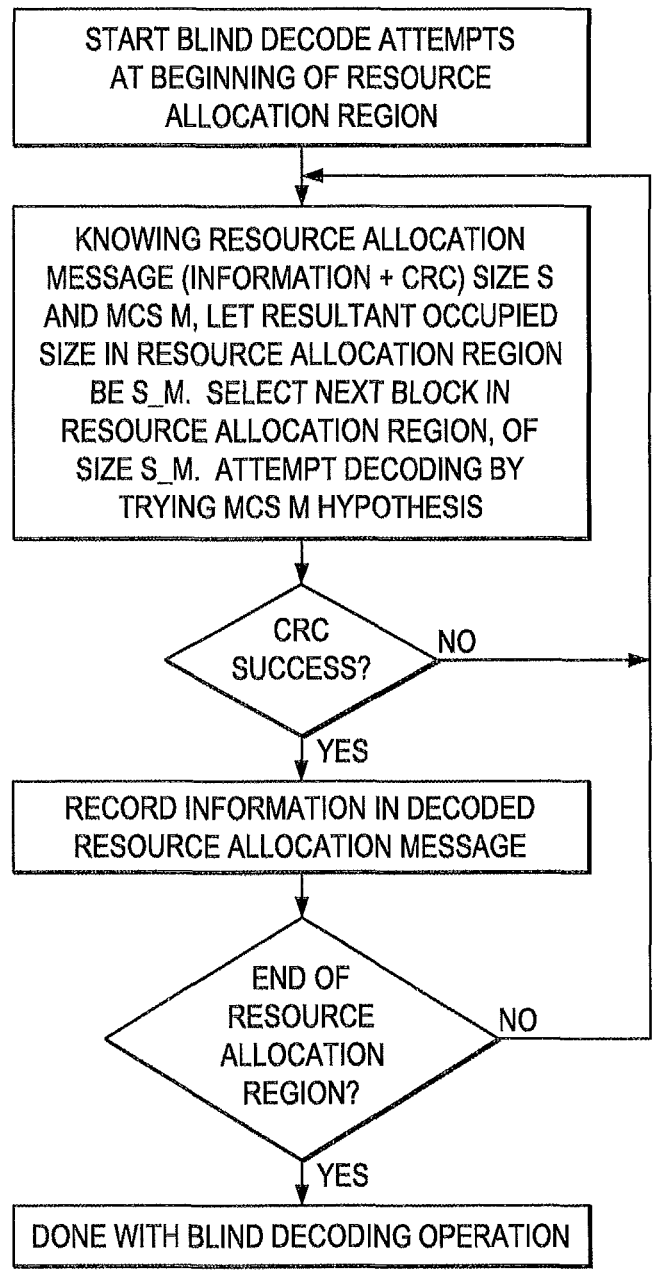
FIG. 2 illustrates a blind decoding operation at a mobile station.

FIG. 2 illustrates a blind decoding operation at a MS where each of the resource allocation messages has the same size (i.e., the same number of information+CRC bits), and each resource allocation message is carried on one BU. Also in FIG. 2, the BUs are processed by the same modulation and coding scheme (MCS), and consequently occupy the same size in the resource allocation region.

Embodiments of the present disclosure focus on the "MS-specific, blind decoding" resource allocation message practice as described above. However, it will be understood that principles of the present disclosure may be applicable in other methods for interpreting a resource allocation message.

In certain situations, a particular resource allocation message may be of variable length, and consequently, may be conveyed using a variable number of BUs. One example is a message used for making allocations to groups of one or more MSs in the proposed IEEE 802.16m system, referred to as the "Group Resource Allocation (GRA) IE". IE stands for "information element", but IE is also a well-known abbreviation for "resource allocation message". As used in this disclosure, IE refers to a resource allocation message.

FIG. 3 is a table illustrating a structure of a GRA IE, according to one embodiment of the present disclosure. As shown in table 300 in FIG. 3, the GRA IE includes an "IE Type" field, a "Resource Offset" field, a "HFA Offset" field, a "User Bitmap" field, a "MIMO Bitmap" field, and a "Resource Assignment Bitmap" field. Each field has a fixed or variable length, as indicated in table 300.

The "IE Type" field, which is the first field inside the message, has a particular value that helps the receiving MS identify the message as a GRA IE. This, in turn, allows the MS to know how to interpret the rest of the fields.

The GRA IE shown in table 300 includes three (3) variable length fields: the "User Bitmap", the "MIMO Bitmap" and the "Resource Allocation Bitmap" fields. Depending on the embodiment, the length of the "User Bitmap" field may be four (4), eight (8), sixteen (16), thirty-two (32), or any other suitable length. In certain embodiments, the receiving MS knows the length of the "User Bitmap" field before transmission of the IE (it is conveyed to the MS via other means). Based on the value of the "User Bitmap" field, it is possible to determine the lengths of the other variable length fields, "MIMO Bitmap" and "Resource Assignment Bitmap".

In one embodiment, each of the "1"s in the value of the "User Bitmap" field corresponds to one (1) bit of length of the "MIMO Bitmap" field. In other words, the length of the "MIMO Bitmap" field is the same as the number of "1"s in the value of the "User Bitmap" field. Similarly, each of the "1"s in the "User Bitmap" field corresponds to five (5) bits of length of the "Resource Allocation Bitmap" field. In other words, the length of the "Resource Allocation Bitmap" field is five (5) times the number of "1"s in the "User Bitmap" field.

For example, assume the "User Bitmap" field has a length of four (4) bits and a value of "1100". Because there are two "1"s in the value of the "User Bitmap" field, it is known that the length of the "MIMO Bitmap" field is two bits, and the length of the "Resource Allocation Bitmap" field is ten bits (2×5=10). Hence, from knowledge of the value of the "User Bitmap" field, the lengths of the other variable length fields, and thus, the total length of the GRA IE, may be determined.

Figure 4:
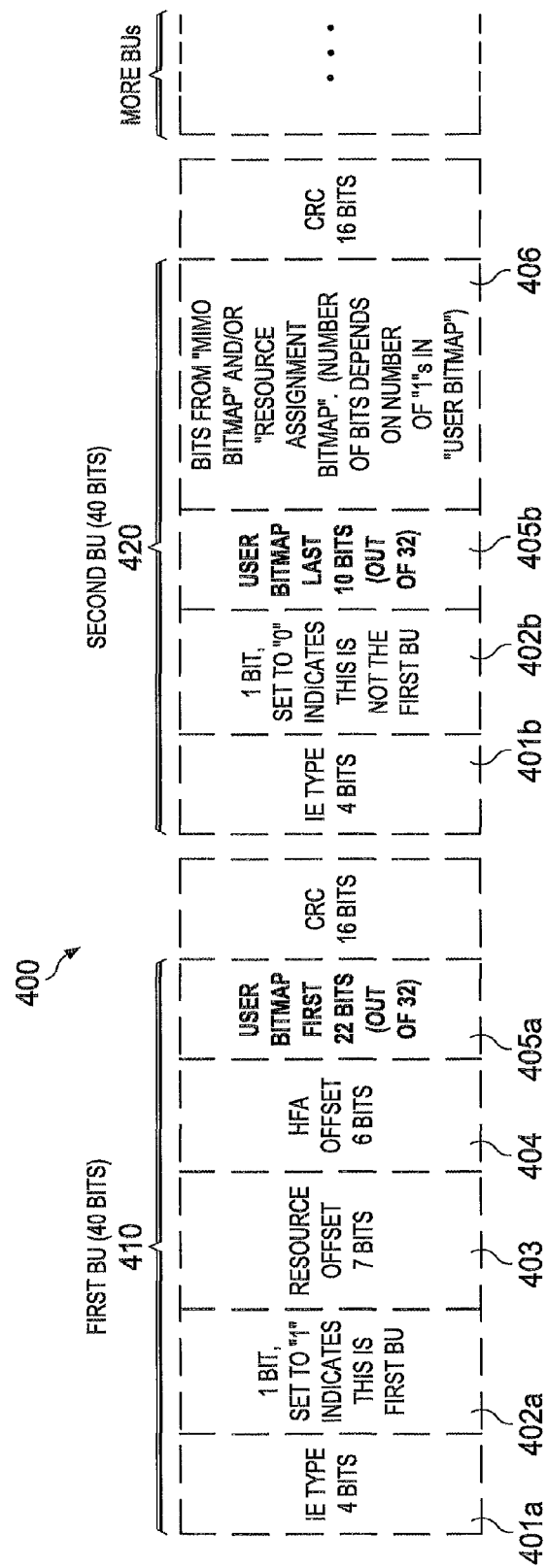
FIG. 4 illustrates an example of a GRA IE that has been partitioned into multiple basic units (BUs), according to an embodiment of the present disclosure.

FIG. 4 illustrates an example of a GRA IE that has been partitioned into multiple BUs, according to an embodiment of the present disclosure.

As noted earlier, a BU in the proposed IEEE 802.16m system contains forty (40) information bits and sixteen (16) CRC bits. Depending on the size of the "User Bitmap" field, a GRA IE may be partitioned into multiple BUs. As shown in FIG. 4, GRA IE 400 is partitioned into at least a first BU 410 and a second BU 420. GRA IE 400 is partitioned because the "User Bitmap" field in this example (indicated by parts 405a and 405b) is thirty-two (32) bits long, which is too long to fit in one (1) BU, as explained below.

Each BU 410, 420 starts with the four-bit "IE Type" field (indicated by reference numerals 401a and 401b) of GRA IE 400. Each "IE Type" field 401a, 401b is followed by a one-bit indicator field 402a, 402b that indicates whether the BU 410, 420 is the first BU. Because BU 410 is the first BU, indicator field 402a is set to "1". Conversely, because BU 420 is not a first BU, indicator field 402b is set to "0".

The remaining parts of each BU 410, 420 are filled in with the remaining fields of GRA IE 400. The remaining fields are not repeated in each BU 410, 420, but rather fill in, in sequence, the remaining parts of BUs 410, 420. Thus, for GRA IE 400, the seven-bit "Resource Offset" field 403 and the six-bit "HFA Offset" field 404 are placed in BU 410. The first twenty-two (22) bits of the "User Bitmap" field 405a fill up the remaining twenty-two (22) bits of BU 410. Because the "User Bitmap" field in GRA IE 400 is thirty-two (32) bits, the remaining ten (10) bits are carried over to BU 420 (as indicated at part 405b). The "MIMO bitmap" and "Resource Assignment Bitmap" fields follow "User Bitmap" field part 405b (as indicated at 406). Depending on the length of the "MIMO bitmap" and "Resource Assignment Bitmap" fields, additional BU's may be used after BU 420.

At the receiving end, the MS parses the fields of GRA IE 400 in order, starting from the "IE Type" field. Once the "User Bitmap" field has been parsed in full (including "User Bitmap" field parts 405a and 405b), the total number of BUs that carry GRA IE 400 may be determined.

Because the "User Bitmap" field of GRA IE 400 is distributed across two parts 405a, 405b in two BUs 410, 420, it may not be possible, from the first BU alone, to calculate the number of BUs carrying the message. This is because the "User Bitmap" field is the basis for determining the length of the entire GRA IE. In some embodiments, it would be desirable to be able to calculate the number of BUs carrying a variable length message upon decoding just the first BU. This would benefit receiver processing, since after parsing the first BU, the receiver would know how many more BUs to expect before the entire message can be decoded.

Such an arrangement would also help to detect and eliminate error conditions sooner. For example, consider the GRA IE structure and partitioning convention described in FIGS. 3 and 4. Suppose that, due to the length of the "MIMO Bitmap" and "Resource Assignment Bitmap" fields, four (4) BUs are used to convey one GRA IE. Further suppose that a receiver (e.g., a receiving MS) successfully decodes the first BU (e.g., BU 410), but fails to decode the second BU (e.g. BU 420).

If the first BU contains information allowing the receiver to calculate the total number of BUs, the receiver would know that it needs to decode three (3) more after the first one. So upon failing to decode the second one, the receiver could skip decoding the third and fourth BUs, since in the absence of the second one, the GRA message cannot be interpreted successfully.

Conversely, if the total number of BUs is not calculated from the first BU, then the receiver may still continue decoding after the failure of the second BU, since the receiver may have no way of knowing if the BUs following the failed second BU are GRA BUs or not. Hence, the receiver would continue decoding as long as the "IE Type" field is set to "GRA" and the single-bit field indicating a first BU is set to "0". Thus, in this example, the receiver would decode the third and fourth BUs unnecessarily.

Embodiments of the present disclosure overcome the above shortcomings. Where variable-length resource allocation messages are carried on several BUs, the disclosed embodiments provide methods to allow the total length of the GRA IE to be calculated based on the first BU alone, or based on a small set of initial BUs in a sequence of multiple BUs.

In particular embodiments, the receiver and transmitter have a common knowledge of the message structure, in terms of the fields in the message, the placement of the fields, the interpretation of each field, and so forth. Also, in particular embodiments, there is a concept of parsing direction in the resource-allocation region, in terms of the order in which the BUs in the sub-region are processed.

For the sake of clarity, some terminology is now defined. The fields in the resource allocation message may be one of the following types.

Fixed-length field—A field whose size in bits is known in advance by the receiver. In the GRA IE shown in table 300 in FIG. 3, the "IE Type" field falls into this category, since it is known to be four (4) bits long.

Primary variable-length field—A field that is variable-length, and in a particular message, may have a particular length selected from a set of allowed lengths. For any particular message, the receiver may know the specific length of this field in that message. In certain embodiments, the length of this field is not calculated from knowledge of any other fields in the message. In the GRA IE shown in table 300 in FIG. 3, the "User Bitmap" is such a field. The "User Bitmap" field has a length that is one of a set of allowed lengths (e.g., the set {4, 8, 16, 32}), and in any particular GRA message, the receiver knows the length of this field.

Secondary variable-length field—A field that is variable-length, and in a particular message, the length of the field may be determined from the contents of one or more primary variable-length fields. In the GRA IE shown in table 300 in FIG. 3, the "MIMO Bitmap" and the "Resource Allocation Bitmap" are such fields. Their lengths can be determined from a knowledge of the contents of the "User Bitmap" field, as explained before (e.g., the length of "MIMO Bitmap"=number of "1"s in "User Bitmap", and the length of "Resource Allocation Bitmap"=5 times number of "1"s in "User Bitmap").

The contents of the primary variable-length fields may be used to determine the lengths of the secondary variable-length fields, using interpretation rules that are part of the message structure. Thus, the contents of the primary variable-length fields allow a receiver to determine the total length of the message. As noted before in the GRA example shown in FIG. 3, knowledge of the "User Bitmap" field allows a determination of the length of the entire GRA message. This, along with knowledge of the BU size, allows a calculation of the number of BUs used to convey the GRA message.

In accordance with embodiments of the present disclosure, a structure of a resource allocation message is provided where, within the constraints of the rules governing the message structure, the primary variable-length fields in the message are placed such that, upon partitioning and packing into the BUs, these fields appear in the smallest possible sequential set of BUs, starting from the first BU in the sequence. The first BU in the sequence is the one that the receiver processes first. The advantage is that, upon decoding this smallest set of BUs, the receiver can calculate the total length of the message and the number of BUs it is partitioned into. This helps to optimize receiver processing in terms of error detection, and also to save processing under error conditions, as described before.

FIG. 5 is a table illustrating a structure of a GRA IE, according to an embodiment of the present disclosure. The GRA IE shown in table 500 includes the same fields as the GRA IE shown in table 300 in FIG. 3. Namely, the GRA IE in table 500 includes "IE Type" field, a "Resource Offset" field, a "HFA Offset" field, a "User Bitmap" field, a "MIMO Bitmap" field, and a "Resource Assignment Bitmap" field. In the GRA IE in table 500, the "User Bitmap" is the Primary variable-length field, whose contents may be used to determine the length of the entire GRA. In contrast to the GRA IE in table 300, the "User Bitmap" field in table 500 is re-positioned right after the "IE Type" field. This helps to ensure that, upon partitioning the GRA IE into multiple BUs, the "User Bitmap" field appears completely in the very first BU.

Figure 6:
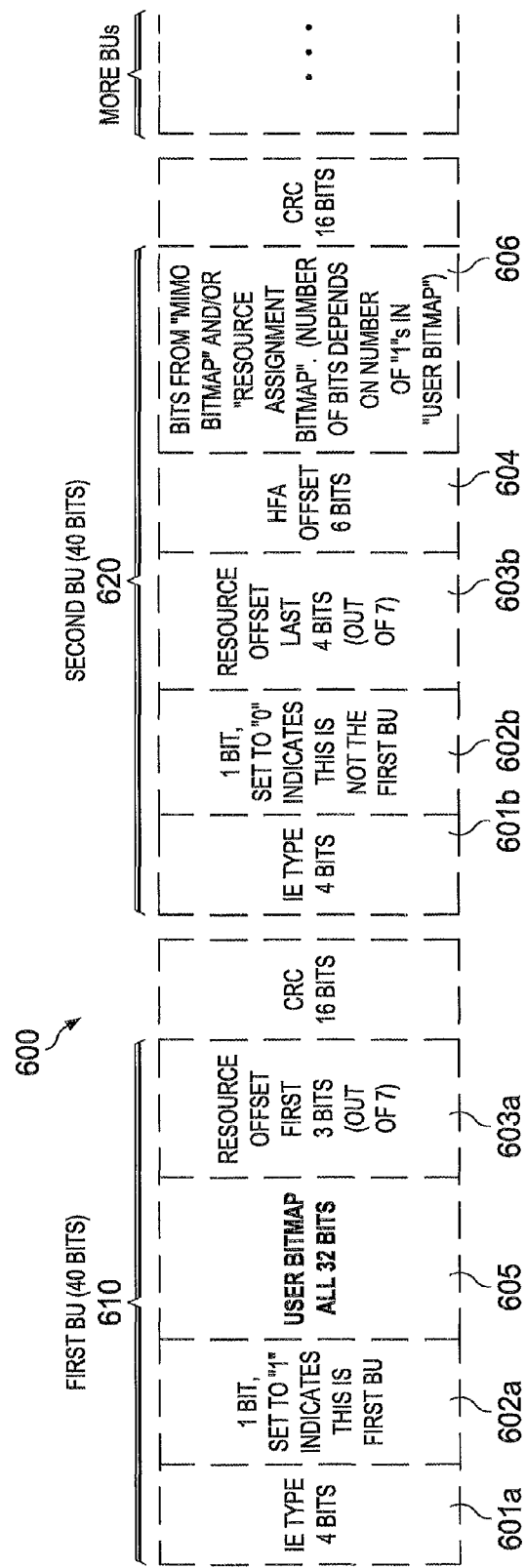
FIG. 6 illustrates an example of a GRA IE shown in FIG. 5 that has been partitioned into multiple BUs, according to an embodiment of the present disclosure.

FIG. 6 illustrates an example of a GRA IE shown in table 500 that has been partitioned into multiple BUs, according to an embodiment of the present disclosure.

Like GRA IE 400 in FIG. 4, GRA IE 600 is partitioned into at least a first BU 610 and a second BU 620, each having a length of forty (40) bits. Each BU 610, 620 starts with the four-bit "IE Type" field (indicated by reference numerals 601*a* and 601*b*) of GRA IE 600. The "IE Type" field 601*a*, 601*b* is followed by a one-bit indicator field 602*a*, 602*b* that indicates whether the BU 610, 620 is the first BU. This is also analogous to the structure of GRA IE 400.

The one-bit field indicator 602*a* is followed by "User Bitmap" field 605. Because "User Bitmap" field 605 is not preceded by a "Resource Offset" field and a "HFA Offset" field, there is adequate space in forty-bit BU 610 to accommodate the entire 32-bit "User Bitmap" field 605. The "Resource Offset" field follows the "User Bitmap" field 605. Because there is not adequate space in BU 610 for the entire "Resource Offset" field, the field is divided between BUs 610 and 620, as indicated by reference numerals 603*a*, 603*b*. The "HFA Offset" field 604 follows the end of "Resource Offset" field 603*b*. The "MIMO bitmap" and "Resource Assignment Bitmap" fields follow "HFA Offset" field 604 (as indicated at 606). Depending on the length of the "MIMO bitmap" and "Resource Assignment Bitmap" fields, additional BU's may be used after BU 620.

Thus, as illustrated in FIG. 6, an advantage of this embodiment is that from the first BU 610, a receiver may calculate both the total length of the entire GRA message 600, as well as the number of BUs it is partitioned into.

In certain embodiments, a property of the message structure is that the "IE Type" be placed as the first field in the message, to allow the receiver parser to distinguish the type of message. To accommodate this, the "User Bitmap" field is placed immediately after the "IE Type" field.

Although only one primary variable-length field ("User Bitmap") is shown in FIGS. 5 and 6, it is contemplated that similar resource allocation messages may include multiple primary variable-length fields. In accordance with principles of the embodiment of FIGS. 5 and 6, multiple primary variable-length fields may be arranged in such a way that upon partitioning, they appear in the smallest possible set of BUs starting from the first BU. In other words, among all the possible placements of the primary variable-length variables, the embodiment of FIGS. 5 and 6 features a particular placement resulting in the primary variable-length fields appearing in the smallest number of BUs. In situations where multiple alternative placements result in the primary variable-length fields appearing in the same number of sequential BUs, any of the alternative placements may be used.

To emphasize the above point, consider an arrangement where the "User Bitmap" field is placed after the "Resource Offset" field. For ease of explanation, this arrangement may be referred to as PlacementOption1. Likewise, the arrangement described in FIG. 6 may be referred to as PlacementOption0. In PlacementOption1, the number of bits taken up by the "IE Type" field+"Resource Offset" field+"User Bitmap" field=4+7+32=43, which is more than the BU size of forty (40) bits. Hence, with PlacementOption1, three (3) bits of the "User Bitmap" would spill over into the second BU. Thus, in PlacementOption1, the "User Bitmap" field appears in two (2) consecutive BUs, starting with the first BU. However, in PlacementOption0, all the bits in the "User Bitmap" field appear in the first BU, as illustrated in FIG. 6. Thus, PlacementOption0 results in the smallest number of BUs carrying the "User Bitmap" field (one BU), in contrast to PlacementOption1, which uses a larger number of BUs (two BUs) to carry the "User Bitmap" field.

In another embodiment, when there are multiple primary variable-length fields in a message, the primary variable-length fields may be arranged sequentially in the message. It should be noted that further embodiments of the present disclosure may be derived by utilizing combinations of the embodiments disclosed herein.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a base station configured to communicate in the wireless network, the base station comprising:
   a processor coupled to a transmitter and configured to generate a resource allocation message, the resource allocation message comprising:
   a resource allocation type field having a fixed length;
   one or more second fixed length fields;
   one or more primary variable-length fields; and
   one or more secondary variable-length fields;
   wherein a length of each of the secondary variable-length fields and a total length of the resource allocation message may be determined based on a value of at least one of the one or more primary variable-length fields, and
   wherein the one or more primary variable-length fields occupy a position in the resource allocation message immediately after the resource allocation type field and preceding the second fixed length fields.

2. The base station of claim 1, wherein the one or more primary variable-length fields comprise a plurality of primary variable-length fields, and every one of the primary variable-length fields occupies a position in the resource allocation message preceding the second fixed-length fields.

3. The base station of claim 1, wherein the one or more primary variable-length fields comprise a plurality of primary variable-length fields, and every one of the primary variable-length fields occupies a position in the resource allocation message preceding the secondary variable-length fields.

4. The base station of claim 1, wherein the one or more primary variable-length fields comprise a plurality of primary variable-length fields arranged to occupy sequential positions in the resource allocation message.

5. The base station of claim 1, wherein the resource allocation message is configured to be partitioned and allocated across a sequence of basic units (BUs).

6. The base station of claim 5, wherein, when the resource allocation message is partitioned across the sequence of BUs, the position of the one or more primary variable-length fields is located in a smallest possible set of sequential BUs, starting from the first BU in the sequence.

7. The base station of claim 5, wherein the base station is configured to encode the resource allocation message using a subscriber station-specific encoding process.

8. The base station of claim 5, wherein each BU comprises a plurality of information bits and a plurality of cyclic redundancy check (CRC) bits.

9. The base station of claim 1, wherein the resource allocation type field is an "IE Type" field and one of the one or more primary variable-length fields is a "User Bitmap" field.

10. The base station of claim 1, wherein the wireless network is an Orthogonal Frequency Division Multiplexing (OFDM) network.

11. For use in a wireless network, a subscriber station configured to communicate in the wireless network, the subscriber station comprising:
   a processor coupled to a receiver and configured to receive a resource allocation message, the resource allocation message comprising:
   a resource allocation type field having a fixed length;
   one or more second fixed length fields;
   one or more primary variable-length fields; and
   one or more secondary variable-length fields;
   wherein a length of each of the secondary variable-length fields and a total length of the resource allocation message may be determined based on a value of at least one of the one or more primary variable-length fields, and
   wherein the one or more primary variable-length fields occupy a position in the resource allocation message immediately after the resource allocation type field and preceding the second fixed length fields.

12. The subscriber station of claim 11, wherein the one or more primary variable-length fields comprise a plurality of primary variable-length fields, and every one of the primary variable-length fields occupies a position in the resource allocation message preceding the second fixed-length fields.

13. The subscriber station of claim 12, wherein the subscriber station is configured to decode each BU using a blind decoding process.

14. The subscriber station of claim 11, wherein the one or more primary variable-length fields comprise a plurality of primary variable-length fields, and every one of the primary variable-length fields occupies a position in the resource allocation message preceding the secondary variable-length fields.

15. The subscriber station of claim 11, wherein the one or more primary variable-length fields comprise a plurality of primary variable-length fields arranged to occupy sequential positions in the resource allocation message.

16. The subscriber station of claim 11, wherein the resource allocation message is received across a sequence of basic units (BUs).

17. The subscriber station of claim 16, wherein, when the resource allocation message is received across the sequence of BUs, the position of the one or more primary variable-length fields is located in a smallest possible set of sequential BUs, starting from the first BU in the sequence.

18. The subscriber station of claim 11, wherein the resource allocation type field is an "IE Type" field and one of the one or more primary variable-length fields is a "User Bitmap" field.

19. For use in a wireless network, a method for transmitting a resource allocation message at a base station, the method comprising:
generating the resource allocation message; and
transmitting the resource allocation message from a transmitter in the base station, the resource allocation message comprising:
a resource allocation type field having a fixed length;
one or more second fixed length fields;
one or more primary variable-length fields; and
one or more secondary variable-length fields;
wherein a length of each of the secondary variable-length fields and a total length of the resource allocation message may be determined based on a value of at least one of the one or more primary variable-length fields, and
wherein the one or more primary variable-length fields occupy a position in the resource allocation message immediately after the resource allocation type field and preceding the second fixed length fields.

20. The method of claim 19, wherein the one or more primary variable-length fields comprise a plurality of primary variable-length fields, and every one of the primary variable-length fields occupies a position in the resource allocation message preceding the second fixed-length fields.

21. The method of claim 19, wherein the one or more primary variable-length fields comprise a plurality of primary variable-length fields, and every one of the primary variable-length fields occupies a position in the resource allocation message preceding the secondary variable-length fields.

22. The method of claim 19, wherein the one or more primary variable-length fields comprise a plurality of primary variable-length fields arranged to occupy sequential positions in the resource allocation message.

23. The method of claim 19, further comprising:
partitioning and allocating the resource allocation message across a sequence of basic units (BUs).

24. The method of claim 23, wherein, when the resource allocation message is partitioned across the sequence of BUs, the position of the one or more primary variable-length fields is located in a smallest possible set of sequential BUs, starting from the first BU in the sequence.

25. The method of claim 23, further comprising:
encoding the resource allocation message using a subscriber station-specific encoding process.

26. The method of claim 23, wherein each BU comprises a plurality of information bits and a plurality of cyclic redundancy check (CRC) bits.

27. The method of claim 19, wherein the resource allocation type field is an "IE Type" field and one of the one or more primary variable-length fields is a "User Bitmap" field.

28. The method of claim 19, wherein the wireless network is an Orthogonal Frequency Division Multiplexing (OFDM) network.

29. For use in a wireless network, a method for receiving a resource allocation message at a subscriber station, the method comprising:
receiving the resource allocation message at a receiver in the subscriber station, the resource allocation message comprising:
a resource allocation type field having a fixed length;
one or more second fixed length fields;
one or more primary variable-length fields; and
one or more secondary variable-length fields;
wherein the one or more primary variable-length fields occupy a position in the resource allocation message immediately after the resource allocation type field and preceding the second fixed length fields; and
determining a length of each of the secondary variable-length fields and a total length of the resource allocation message based on a value of at least one of the one or more primary variable-length fields.

30. The method of claim 29, wherein the one or more primary variable-length fields comprise a plurality of primary variable-length fields, and every one of the primary variable-length fields occupies a position in the resource allocation message preceding the second fixed-length fields.

31. The method of claim 29, wherein the one or more primary variable-length fields comprise a plurality of primary variable-length fields, and every one of the primary variable-length fields occupies a position in the resource allocation message preceding the secondary variable-length fields.

32. The method of claim 29, wherein the one or more primary variable-length fields comprise a plurality of primary variable-length fields arranged to occupy sequential positions in the resource allocation message.

33. The method of claim 29, wherein the resource allocation message is received across a sequence of basic units (BUs).

34. The method of claim 33, wherein, when the resource allocation message is received across the sequence of BUs, the position of the one or more primary variable-length fields is located in a smallest possible set of sequential BUs, starting from the first BU in the sequence.

35. The method of claim 29, wherein the resource allocation type field is an "IE Type" field and one of the one or more primary variable-length fields is a "User Bitmap" field.

36. The method of claim 29, further comprising:
decoding each BU using a blind decoding process.

* * * * *